Feb. 23, 1937. F. ACCARDI 2,071,449

ALL-METAL COACHWORK FOR AUTOMOBILES

Filed July 26, 1935

Inventor
Ferruccio Accardi
By Sommers & Young Attys

Patented Feb. 23, 1937

2,071,449

UNITED STATES PATENT OFFICE 2,071,449

ALL-METAL COACHWORK FOR AUTOMOBILES

Ferruccio Accardi, Turin, Italy, assignor to Fiat Società Anonima, Turin, Italy

Application July 26, 1935, Serial No. 33,402
In Italy February 20, 1935

2 Claims. (Cl. 296—28)

This invention relates to an all-metal coachwork, preferably of light construction, which is more particularly suitable for small automobiles, such as two-seaters. According to this invention the framework of the coach is comprised of lateral frames of sheet metal following the contour of the doors and connected in front by two cross members above and beneath the windshield, of which the lower one may consist of the dashboard. The flooring and external covering both of sheet metal are welded to the framework. According to this invention the sections of the frame members are of such form that the welding points are covered on the inside of the car by the frame members themselves. It is thus posible to leave the frame members suitably lacquered visible on the inside of the coachwork. The internal covering made of cloth or the like can be glued directly to the inner face of the sheet metal covering and its edges are fitted in slits between the frame members and the metallic covering.

The accompanying drawing shows a construction of the object of this invention.

Figure 1:
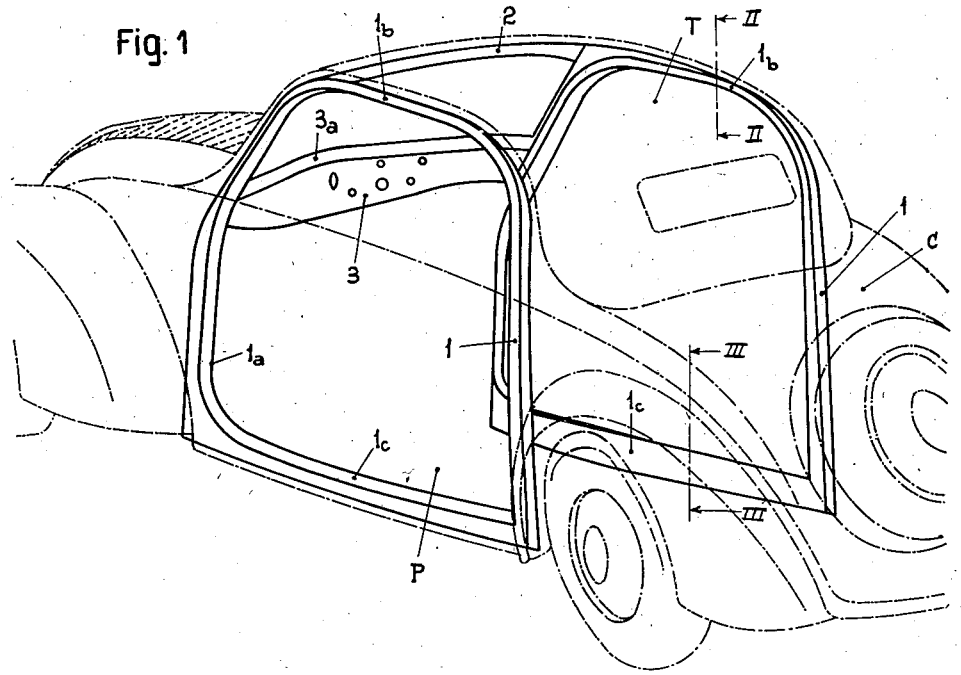
Figure 1 is a perspective view showing the arrangement of the framework with respect to the other parts of the coachwork.

The sheet metal framework of the all-metal coachwork consists essentially of two lateral frames following approximately the contour of the doors and each constituted by a rear upright 1, a front upright 1a, a top longéron 1b and a bottom longéron 1c, as well as of a top cross member 2 and dashboard 3, which with the flange 3a serves as second cross member and encircles together with the cross member 2 the wind shield. The top longérons 1b receive the roof T which may be integral with the upper covering C of the rear car portion welded to the rear uprights 1. The floor P is attached to the lower longérons 1c.

Figure 2:
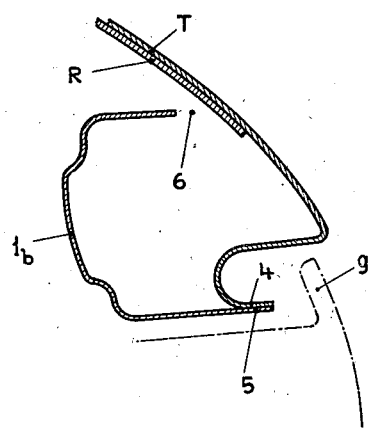
Figure 2 is a section taken through the top longéron of the framework on the section line II—II of Fig. 1.

The edges of the sheet metal covering are point welded to the inner edge of the framework only. The edge 4 of the roof T (Fig. 2) is welded to the inner side of the lower flange 5 of the U-shaped longéron 1b. The weld is thereby invisible from the inside of the car and is covered on the outside by the door rabbet 9 when the door is closed.

A slit 6 is left between the framework and the external metallic covering and receives the edge of the internal covering R of cloth or other sound deadening and non-conductive material. The internal covering R may be applied to the external sheet metal covering member while the visible parts of the framework are simply lacquered.

The coachwork is therefore free from any special supports for the internal covering, is roomy, of light and easy construction, smart in appearance and particularly advantageous for small cars, such as two-seaters.

Figure 3:
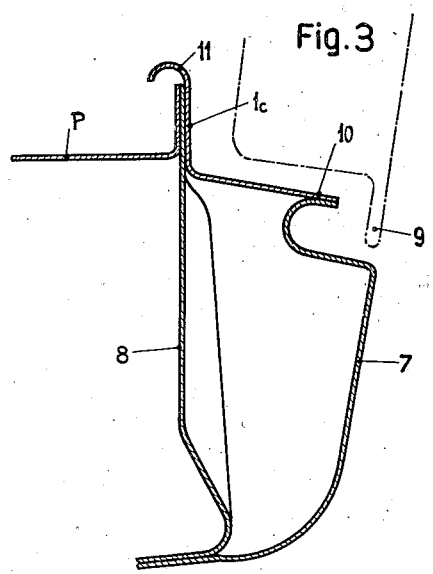
Figure 3 is a section taken through the bottom longéron of the framework on the section line III—III of Fig. 1.

The bottom longéron 1c (Fig. 3) is of approximatively L-shape. The external sheet metal covering 7 is welded to the lower face of the horizontal flange so that the weld is covered externally by the door rabbet 9. The vertical flange of the longéron 1c is further connected with the lower edge of the sheet metal member 7 by an auxiliary sheet metal member 8 welded to said members 7 and 1c. The sheet metal floor P is point welded to the rear face of the portion of the sheet metal member 8 welded to the longéron 1c. This weld is not visible from the outside and is covered to the sight from inside by the bend 11 at the top end of the vertical flange of the longéron 1c.

What I claim is:

1. Coachwork for automobiles comprising a stamped sheet metal frame constituted by two substantially quadrangular side frames and two front cross members serving as frame for the windshield, the sides of said quadrangular frames being C-shaped in cross section, a sheet metal covering, of which the edges are welded to a flange of each of said C-shaped sides and form with the other flanges of said sides slit, and a lining applied to the inside of said covering and extending through said slit within said sides to hide the edges of said lining.

2. Coachwork for automobiles, comprising a stamped sheet metal frame constituted by two substantially quadrangular side frames forming the frames for the coachwork doors and two front cross members serving as frame for the windshield, the pillars and top longéron of the quadrangular frames and the cross members being C-shaped in cross section, the bottom longérons being L-shaped in cross section, a sheet metal covering having edges welded to flanges of said C-shaped members and being spaced from the other flanges thereby forming slits with said other flanges, a lining applied to the inside of said covering and extending through said slit within said sides for hiding the edges of said lining, a floor member welded to the vertical flange of said L-shaped bottom longéron and a bend at the top end of said vertical flange to cover the weld.

FERRUCCIO ACCARDI.